Figure 1:
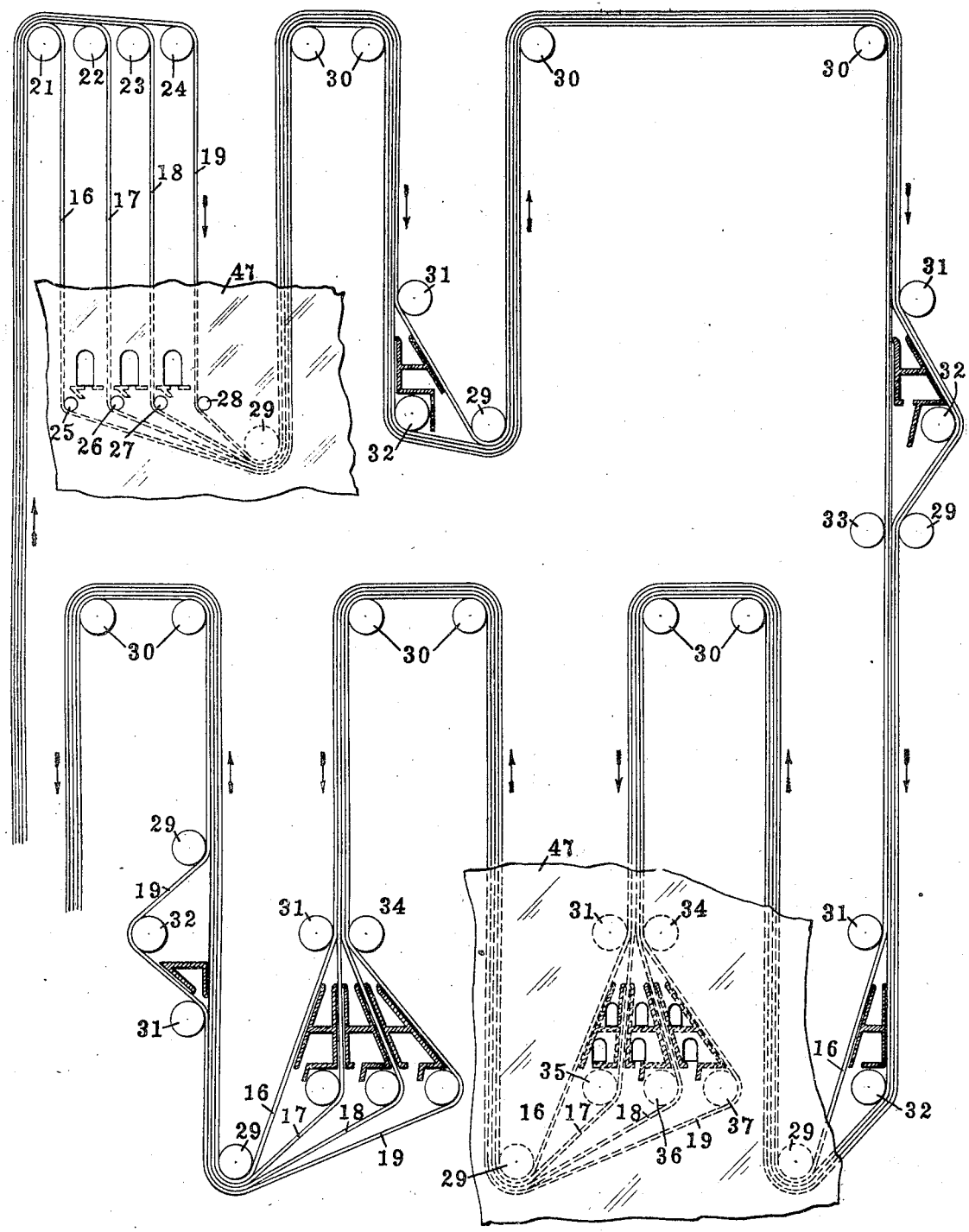

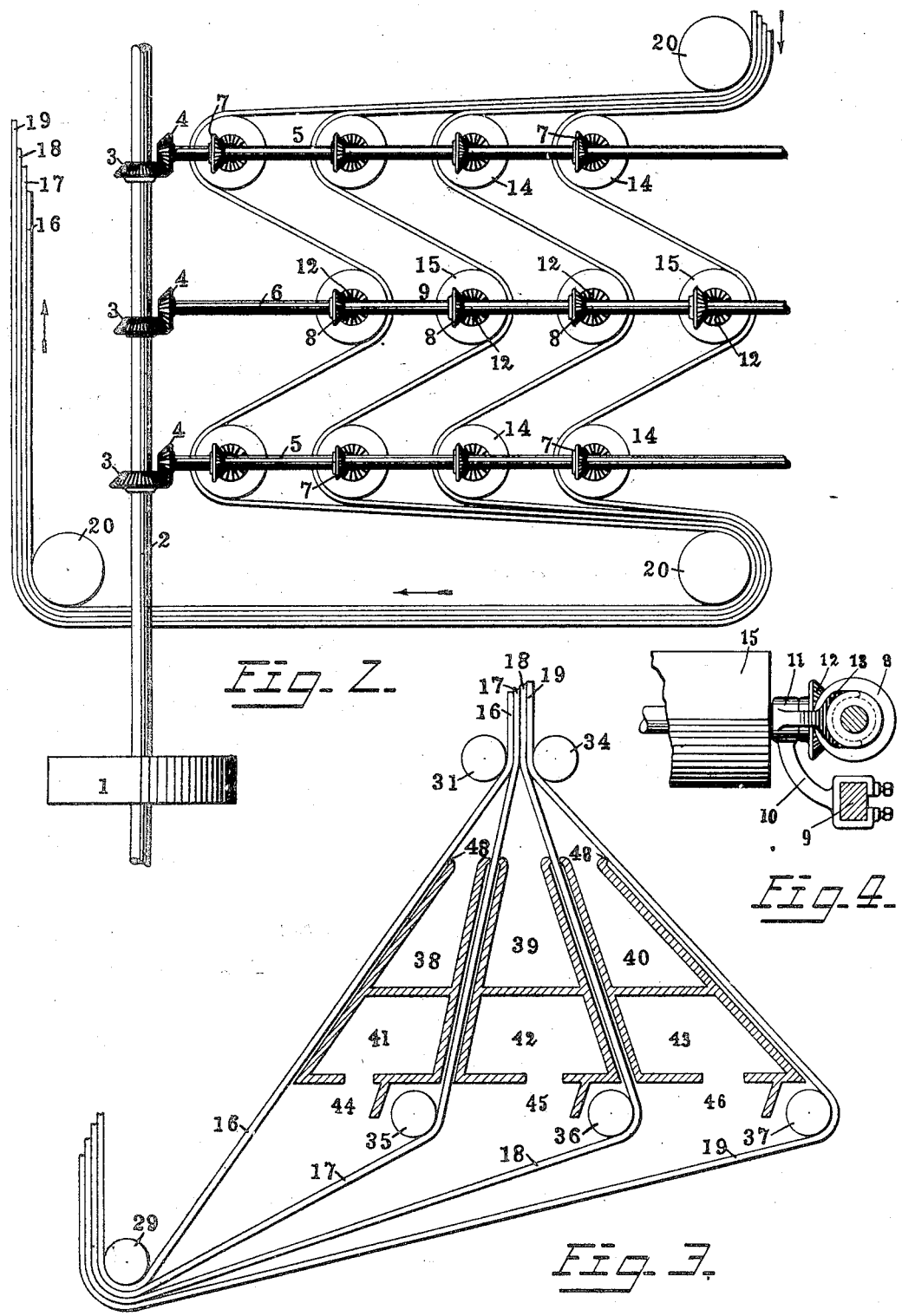

UNITED STATES PATENT OFFICE.

ROBERT W. VAIL, OF NEW YORK, N. Y.

ENDLESS-BELT CONVEYER.

1,103,635.

Specification of Letters Patent.

Patented July 14, 1914.

Application filed August 20, 1912. Serial No. 716,109.

*To all whom it may concern:*

Be it known that I, ROBERT W. VAIL, a citizen of the United States, and resident of New York, in the county of New York and State of New York, have invented certain new and useful Improvements in Endless-Belt Conveyers, of which the following is a specification.

The present invention refers to conveyers and more particularly to belt structures in endless belt conveyers used for the purpose of receiving, transmitting and delivering telegrams, letters or other articles, from one station to another.
The object of the present invention is to provide an improved conveying system, having a plurality of traveling endless conveying belts for securing a larger number of transmitting and receiving stations, than could have been arranged in belt conveyer systems heretofore used. These systems might be classified as single belt conveyers, inasmuch as they comprise an endless belt which, for part of its length only, is in contact and coöperates with another single belt and only for this short distance acts as a conveying means.

The present invention comprises a system of two or more endless belts which are in contact throughout the greater part of their length and are locally spread apart, for short distances only, for the purpose of receiving articles, and then travel again in contact with each other to a receiving station, where they deliver the article.

Means are shown for adjusting the belts, should they become stretched and, therefore, fail to properly grip the articles, all of which contribute to the organization of a conveying system of singular simplicity, high efficiency and great compactness, combined with flexibility.

The invention is illustrated in the drawing in which, Figure 1, represents the conveying system in a diagrammatic way, Fig. 2, a side elevation of the driving mechanism therefor, Fig. 3, a detail of construction of a transmitting and receiving station, and Fig. 4, a detail of the driving mechanism.

The driving mechanism comprises a suitable prime motor operating a driving pulley 1, on a driving shaft 2, to which are secured the bevel gears 3. These gears are in mesh with similar bevel gears 4, on the driven shafts 5 and 6. The shafts 5 have bevel gears 7, secured thereto, while the shaft 6 is provided with the bevel gears 8, keyed to but slidable on the shaft.

A stationary bar 9, Fig. 4, is part of the general frame (not otherwise shown) and is located parallel to and underneath the shaft 6, and carries brackets 10 slidable thereon, carrying the bearings 11 for the bevel gears 12, and the forks 13, engaging the bevel gears 8. The bevel gears 7 mesh similar bevel gears of the stationary driving rollers 14, while the bevel gears 8 mesh with the bevel gears 12 of the adjustable driving rollers 15. A series of endless belts 16, 17, 18 and 19, are superpose upon another, encompassing and infolding one another, and are arranged to run around the driving rollers and over the idlers 20 to the transmitting and receiving stations.

Referring now to Fig. 1, of the drawing, 21, 22, 23 and 24, are separating rollers, for the purpose of moving apart and out of contact, one or more of the belts from the adjacent belt or belts and 25, 26, 27 and 28, are guide rollers from which all the belts of a combined transmitting and receiving station converge to a collecting roller 29. The belts then run over the idlers 30 to a second station. In this station, after passing a retaining roller 31, the belts except one of the same are taken off by being run over a spreading roller 32, but thereafter joined again at the collecting roller 29. A number of different constructions of stations are shown in the drawing requiring modifications in the organization of their parts, according to the conditions presented. 33, for instance, is a guide or retaining roller, used in case that the incoming and outgoing belts are located in substantially the same plane. In another station a roller 34 is used to coöperate with one of the rollers 31 for holding the belts together, whereafter they are separated again by the rollers 35, 36, and 37. Each station comprises, according to the number of belts employed, a number of receiving compartments 38, 39 and 40 and receiving compartments 41, 42 and 43. These compartments are shown in an enlarged view in Fig. 3 of the drawing, where the walls of the compartments 38, 39 and 40, adjacent to the traveling belts are formed with tongues 48, which might, but not necessarily need, make contact with the belts and might but not need, be wedge-shaped, so as to permit an article, such as a paper containing a telegram, to be guided off the traveling belt and permitted to drop into a receiving compartment. The transmitting compartments 41, 42 and 43 are provided with slots 44, 45 and 46, through which the messages are dropped upon the traveling belts.

The entire conveying system is preferably inclosed within the walls or behind a partition of the building and the parts cannot only be located in different rooms, but might be on different floors of the building. The driving mechanism is preferably located at any convenient accessible place. The transmitting and receiving stations, usually located on a table or desk top, are provided with glass fronts 47, so as to see whether messages have been received in the receiving compartments or messages placed in the transmitting compartments have been conveyed off.

The drawing illustrates the receiving stations located in any branch of the conveying system whether the traveling belts run vertically upward or downward. The transmitting stations, however, are preferably always so arranged that the outgoing legs of the traveling belts are run at an angle to the horizontal, so that messages placed in the transmitting compartment, fall through the slots thereof by gravity upon the traveling belt and are carried thereon to their destination. In case that the belts should become stretched, on account of extended use, or for other reasons, the adjustable driving rollers are moved by means of the brackets 10, until the proper degree of tightness is again maintained.

The operation of the device is thought to be obvious. Any message, such as a letter, telegram or newspaper, or any other article, if placed into a transmitting compartment and dropped through its slot upon one leg of a traveling belt, which, in time, contacts with its adjacent belt, is gripped tightly and carried along until the belt or belts are spread apart by means of one of the spreading rollers, drop the message, after which the belts are brought together again for further travel.

The inventor considers as new and useful and desires to secure by Letters Patent of the United States the following:—

1. A conveyer system comprising a plurality of traveling endless belts having contact with each other for the greater part of their lengths, and a plurality of receiving and transmitting stations, said belts being spread apart at said stations for transmitting and receiving articles thereat.

2. A conveyer system comprising a plurality of traveling endless belts having contact with each other for the greater part of their lengths, and a plurality of receiving and transmitting stations, located between said belts, said belts being spread apart at said stations for transmitting and receiving articles thereat.

3. A conveyer system comprising a plurality of traveling endless belts having contact with each other for the greater part of their lengths, a plurality of receiving and transmitting stations, said belts being spread apart at said stations for transmitting and receiving articles thereat, and means for driving said belts.

4. A conveyer system comprising a plurality of traveling endless belts having contact with each other for the greater part of their lengths, and a plurality of receiving and transmitting stations, said belts being spread apart at said stations for transmitting and receiving articles thereat, means for driving said belts, and means for adjusting the tension thereof.

5. A conveyer system comprising a plurality of traveling endless belts having contact with each other for the greater part of their lengths, a plurality of receiving stations located between said belts, and a plurality of transmitting stations also located between said belts, means for separating and spreading the belts at one end of said stations, and means for again bringing the belts into contact with each other at the other end of said stations.

6. A conveyer system comprising a plurality of traveling endless belts having contact with each other for the greater part of their lengths, a plurality of receiving stations located between said belts, a plurality of transmitting stations also located between said belts, means for separating and spreading the belts at one end of said stations, means for again bringing the belts into contact with each other at the other end of said stations, and mechanism for driving said belts.

7. A conveyer system comprising a plurality of traveling endless belts having contact with each other for the greater part of their lengths, a plurality of receiving stations located between said belts, a plurality of transmitting stations also located between said belts, means for separating and spreading the belts at one end of said stations, and means for again bringing the belts into contact with each other at the other end of said stations, and mechanism for driving said belts.

In witness whereof the inventor has hereunto set his hand in the presence of two subscribing witnesses, at New York, in the county of New York and State of New York, this 16th day of August, 1912.

ROBERT W. VAIL.

In presence of—
 RALPH JULIAN SACHERS,
 G. M. GRINDLAY.